US010675956B2

(12) United States Patent
Yagi et al.

(10) Patent No.: US 10,675,956 B2
(45) Date of Patent: Jun. 9, 2020

(54) DEVICE FOR OPENING AND CLOSING OPENING/CLOSING BODY

(71) Applicant: HI-LEX CORPORATION, Hyogo (JP)

(72) Inventors: Mikiya Yagi, Hyogo (JP); Kenji Matsumoto, Hyogo (JP); Yusaku Hirano, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 16/076,704

(22) PCT Filed: Jan. 31, 2017

(86) PCT No.: PCT/JP2017/003345
§ 371 (c)(1),
(2) Date: Aug. 9, 2018

(87) PCT Pub. No.: WO2017/138404
PCT Pub. Date: Aug. 17, 2017

(65) Prior Publication Data
US 2019/0077234 A1 Mar. 14, 2019

(30) Foreign Application Priority Data
Feb. 9, 2016 (JP) .................................. 2016-022765

(51) Int. Cl.
*B60R 22/00* (2006.01)
*E05F 15/00* (2015.01)
(Continued)

(52) U.S. Cl.
CPC ............... *B60J 5/107* (2013.01); *B60J 5/106* (2013.01); *E05F 15/41* (2015.01); *E05F 15/622* (2015.01);
(Continued)

(58) Field of Classification Search
CPC .. B60J 5/106; B60J 5/107; E05F 15/41; E05F 15/616; E05F 15/622; E05F 15/695;
(Continued)

(56) References Cited

U.S. PATENT DOCUMENTS 5,448,856 A * 9/1995 Moore .................. E05F 15/611
49/28
5,563,483 A * 10/1996 Kowall .................... E05B 81/14
318/266

(Continued)

FOREIGN PATENT DOCUMENTS

JP         2015-218443 A       12/2015

OTHER PUBLICATIONS

International Search Report from International Application No. PCT/JP2017/003345 dated Apr. 25, 2017.

*Primary Examiner* — Harry Y Oh
(74) *Attorney, Agent, or Firm* — Brundidge & Stanger, P.C.

(57) ABSTRACT

When it is determined that there is an individual abnormality, in which an individual drive section is in an abnormal state, while the opening/closing body is being moved by the drive sections or the opening/closing body is stopped in an open state, the opening/closing body operation device performs a restriction control on the drive section with the individual abnormality, the restriction control restricting the movement of the opening/closing body in the closing direction. The opening/closing body operation device makes a comparison of the driving state between the drive section subjected to restriction control and another drive section, and when it is determined that the drive sections are normal with respect to each other, the opening/closing body operation device deems the opening/closing body to be in a normal state and disengages the restriction control.

2 Claims, 7 Drawing Sheets

(51) Int. Cl.
*G05D 1/00* (2006.01)
*G05D 3/00* (2006.01)
*G06F 7/00* (2006.01)
*G06F 17/00* (2019.01)
*B60J 5/10* (2006.01)
*E05F 15/41* (2015.01)
*E05F 15/622* (2015.01)
*E05F 15/695* (2015.01)

(52) U.S. Cl.
CPC ......... *E05F 15/695* (2015.01); *E05Y 2400/31* (2013.01); *E05Y 2400/40* (2013.01); *E05Y 2400/502* (2013.01); *E05Y 2400/554* (2013.01); *E05Y 2900/532* (2013.01); *E05Y 2900/546* (2013.01)

(58) Field of Classification Search
CPC ......... E05Y 2400/554; E05Y 2900/532; E05Y 2900/546
See application file for complete search history.

(56) References Cited

U.S. PATENT DOCUMENTS

| | | | | |
|---|---|---|---|---|
| 5,836,050 A | * | 11/1998 | Rumez | E05C 17/30 16/84 |
| RE38,400 E | * | 1/2004 | Kowall | E05B 81/14 318/266 |
| 2017/0081895 A1 | * | 3/2017 | Osafune | B60J 5/10 |

* cited by examiner

DEVICE FOR OPENING AND CLOSING OPENING/CLOSING BODY

TECHNICAL FIELD

The present invention relates to an apparatus to open and close an opening/closing body.

BACKGROUND ART

As an apparatus which performs an opening/closing operation by rotating an opening/closing body, such as a tailgate or an out-swinging window of an automobile, an apparatus to open and close an opening/closing body (hereinafter, may be referred to as "opening/closing body opening and closing apparatus") has been known. An opening/closing body opening and closing apparatus illustrated in Patent Literature (hereinafter, referred to as "PTL") 1, for example, includes an actuator section which is extendable and contractible by driving force of a built-in motor, and this opening/closing body opening and closing apparatus is an apparatus which opens and closes the opening/closing body attached in an openable and closeable manner to a main body of an automobile or the like, by using extension and contraction of the actuator section.

CITATION LIST

Patent Literature

PTL 1
Japanese Patent Application Laid-Open No. 2015-218443

SUMMARY OF INVENTION

Technical Problem

Meanwhile, when a plurality of opening/closing body opening and closing apparatuses as illustrated in PTL 1 are used as driving sections, there may be a case where any of the plurality of opening/closing body opening and closing apparatuses comes off from the vehicle body during a closing operation or maintaining of an open state. In this case, the opening/closing body falls off rapidly. In order to prevent the opening/closing body from falling off in this manner, the driving sections need to be firmly attached to the vehicle body so as not to come off from the vehicle body. For this reason, an attachment structure of the driving sections becomes complicated and there arises a problem in that the number of parts increases.

An object of the present invention is to provide an opening/closing body opening and closing apparatus which prevents rapid falling off of an opening/closing body, using a simple structure.

Solution to Problem

An apparatus to open and close an opening/closing body, according to the present invention includes an opening member including an opening, the opening/closing body which sets the opening to an open state or a closed state in which a mass of the opening/closing body acts in a closing direction, a plurality of driving sections which move the opening/closing body in an opening direction and the closing direction, an opening/closing control section which controls the plurality of driving sections, and a detection section which detects an operation of the plurality of driving sections. The opening/closing control section monitors a driving state of each of the plurality of driving sections by a signal from the detection section. In the apparatus, when at least one of the plurality of driving sections is determined to be independently abnormal (independently in an abnormal state) during movement of the opening/closing body by the driving sections or during stopping of the opening/closing body in the open state, the opening/closing control section performs a regulation control on the at least one of the plurality of driving sections which is independently abnormal, the regulation control regulating movement of the opening/closing body in the closing direction. When the at least one of the plurality of driving sections which is independently abnormal and any other one of the plurality of driving sections are determined to be relatively normal by comparing the driving state of the at least one of the plurality of driving sections which is independently abnormal and on which the regulation control has been performed with the driving state of the other one of the plurality of driving sections, the opening/closing control section releases the regulation control on the at least one of the plurality of driving sections which is independently abnormal, as the opening/closing body is in a normal state.

Advantageous Effects of Invention

According to the present invention, rapid falling off of an opening/closing body can be prevented with a simple structure.

DESCRIPTION OF EMBODIMENTS

Hereinafter, a description of an embodiment of the present invention will be given in detail with reference to the drawings.

[Overall Configuration of Opening/Closing Body Opening and Closing Apparatus 1]

Figure 1:
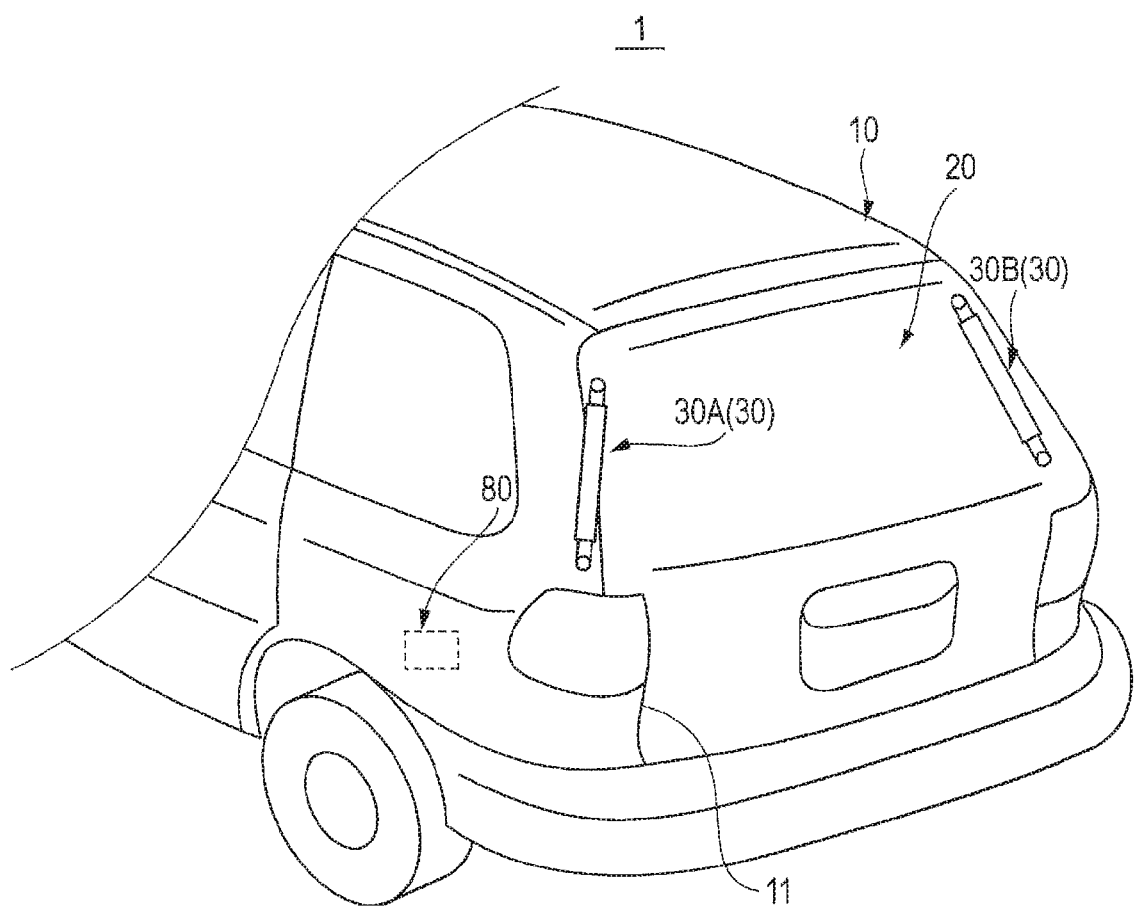
FIG. 1 is a perspective view of a rear part of an automobile, which illustrates an opening/closing body opening and closing apparatus according to an embodiment of the present invention.
Figure 2:
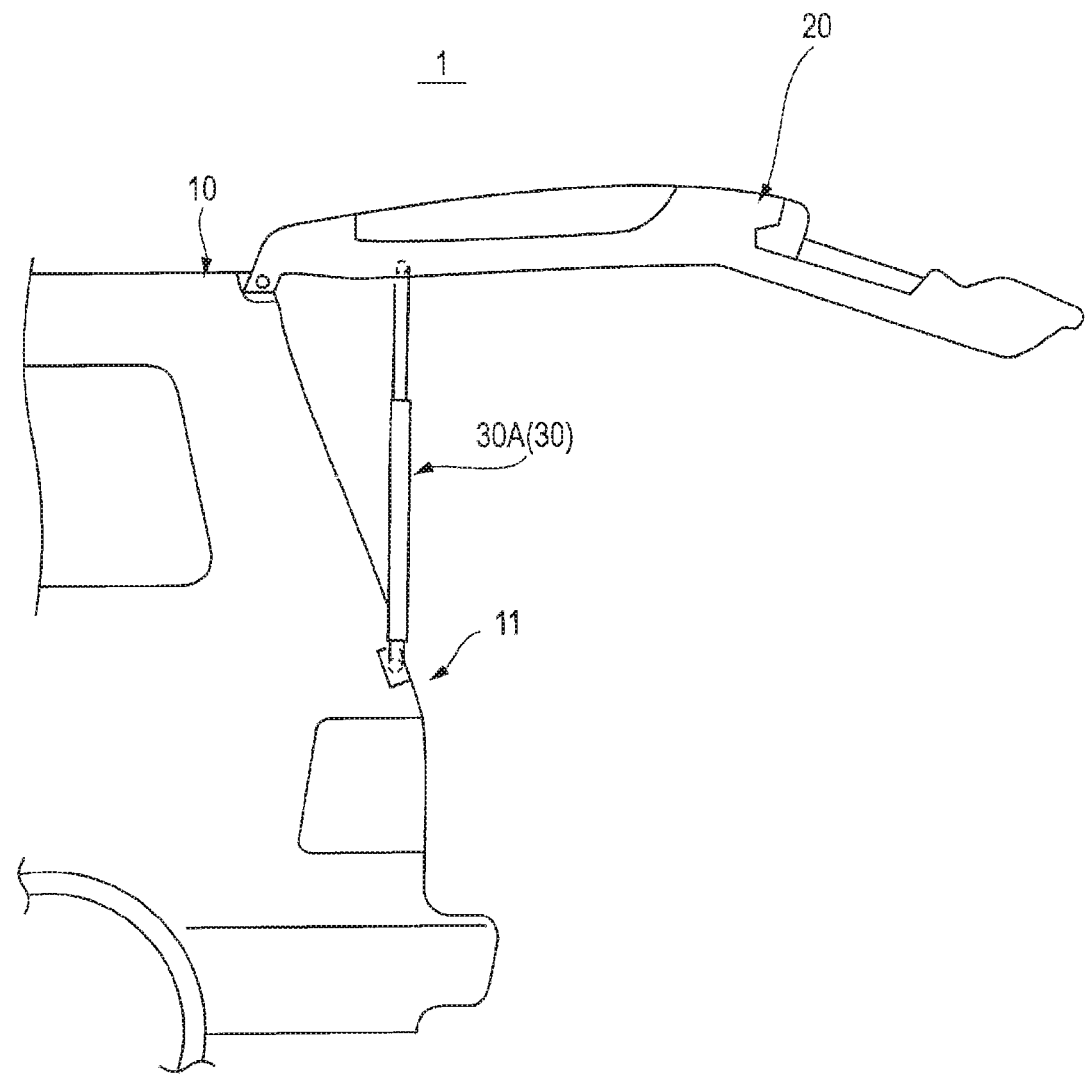
FIG. 2 is a side view of the opening/closing body opening and closing apparatus.

FIG. 1 is a perspective view of a rear part of an automobile, which illustrates an opening/closing body opening and closing apparatus of an embodiment according to the present invention, and FIG. 2 is a side view of the opening/closing body opening and closing apparatus. Note that, the rear part of the automobile illustrated in the present embodiment is an example of the opening/closing body opening and closing apparatus.

Opening/closing body opening and closing apparatus 1 includes opening member 10 which includes opening 11, opening/closing body 20, a plurality of driving sections 30A and 30B, detection section 51 (see FIG. 5), and opening/closing control section 80. Hereinafter, unless any of driving section 30A and driving section 30B needs to be specified, driving section 30A and driving section 30B are collectively referred to as "driving section 30" for the sake of convenience.

Opening/closing body opening and closing apparatus 1 is an apparatus which causes opening/closing body 20 to transition between an open state and a closed state with respect to opening 11 of opening member 10.

[Opening Member]

In the rear part of the automobile illustrated as an example of opening/closing body opening and closing apparatus 1 in the present embodiment, opening member 10 forms a rear part of a vehicle body. The shape of opening 11 may be any shape including a rectangular shape or a circular shape, for example.

[Opening/Closing Body]

Opening/closing body 20 sets opening 11 of opening member 10 to an open state or a closed state. In a rear part of a vehicle, the open state of opening 11 is a state that allows for carrying an object, such as a luggage, into or from a rear trunk from or to outside via opening 11. Further, the closed state is a state where opening 11 has been closed. Opening/closing body 20 is attached in an openable and closeable manner to opening member 10 in such a manner that the mass of opening/closing body 20 acts in a closing direction.

When opening member 10 is a vehicle body of a rear part of an automobile as in the case of the present embodiment, for example, a tailgate is a tailgate which is an example of opening/closing body 20, for example.

As illustrated in FIG. 1 and FIG. 2, opening/closing body 20 is provided so as to be movable between an open position and a closed position with respect to the opening member. In this embodiment, opening 11 is set to be in the open state or the closed state by rotating a side of a lower side portion of opening/closing body 20 up and down about a pivot point portion of an upper side portion of opening/closing body 20 on a side of an upper edge portion of opening 11.

[Driving Section]

A plurality of driving sections 30 move opening/closing body 20 in an opening direction and a closing direction with respect to opening 11 of opening member 10. The plurality of driving sections 30 move opening/closing body 20 by driving of each driving section 30, and relatively move opening/closing body 20 with respect to opening member 10, and thus set opening 11 to be in the open state or the closed state. As long as each of the plurality of driving sections 30 enables movement of opening/closing body 20 in a direction in which opening 11 becomes the open state (movement to opening direction) and movement of opening/closing body 20 in a direction in which opening 11 becomes the closing direction (movement in closing direction), the plurality of driving sections may respectively drive in the same direction with the same driving amount or in different directions or with different driving amounts. In this embodiment, each driving section is provided so as to perform the same driving in synchronization.

A plurality of driving sections 30 are provided so as to be placed between opening member 10 and opening/closing body 20 such that opening/closing body 20 is relatively movable with respect to opening member 10. In order for opening/closing body 20 to rotatably move with respect to the opening member 10, driving sections 30 are each attached rotatably with respect to opening member 10 such that each of driving sections 30 can drive while turning to follow with the rotating of opening/closing body 20.

More specifically, each driving section 30 has a rod shape which extends and contracts, and includes a driving main-body portion which is disposed on a side of one end portion of driving section 30 and is connected on a side of opening member 10, and a forward-backward moving section. The forward-backward moving section is attached so as to be capable of protruding and receding from the other end portion (side of the other end portion with respect to driving section 30) of the driving main-body portion and which has an end portion connected on a side of opening/closing body 20. Driving section 30 can move, by moving the forward-backward moving section forward and backward in a longitudinal direction of driving sections 30 with respect to the driving main-body portion, opening/closing body 20 to a fully closed position, i.e., the position where opening/closing body 20 completely covers opening 11, and to a fully opened position, i.e., the position where opening 11 becomes a maximum open state. Each driving section 30 moves opening/closing body 20 in the opening direction or the closing direction by converting a rotary motion of a motor or the like into an extension and contraction motion in a linear direction.

As long as driving section 30 enables opening and closing of opening/closing body 20, the structure, shape and disposing position of driving section 30 are not particularly limited, and the number of driving sections 30 to be used is not particularly limited. In a case where at least two driving sections 30 are used, and each of driving sections 30 has a rod shape as in the present embodiment, two or more rods are disposed. As illustrated in FIG. 1, in the present embodiment, driving sections 30 are disposed respectively on both left and right sides of the rear part of the automobile.

Figure 3:
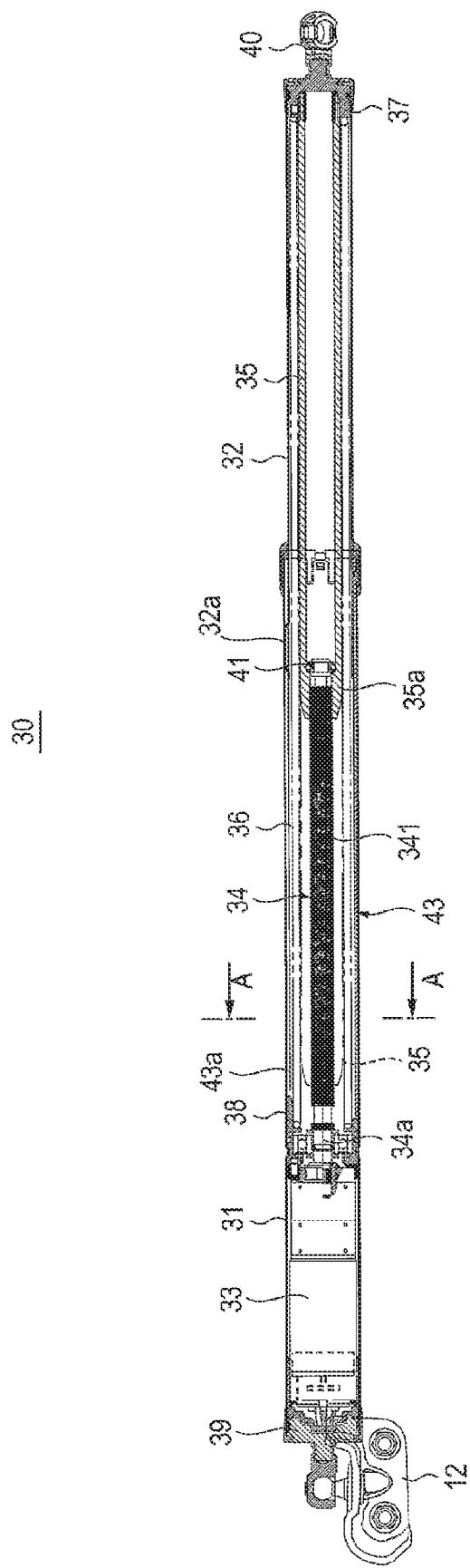
FIG. 3 is a partial cross-sectional view illustrating a configuration of a main part of an exemplary driving section of the opening/closing body opening and closing apparatus.
Figure 4:
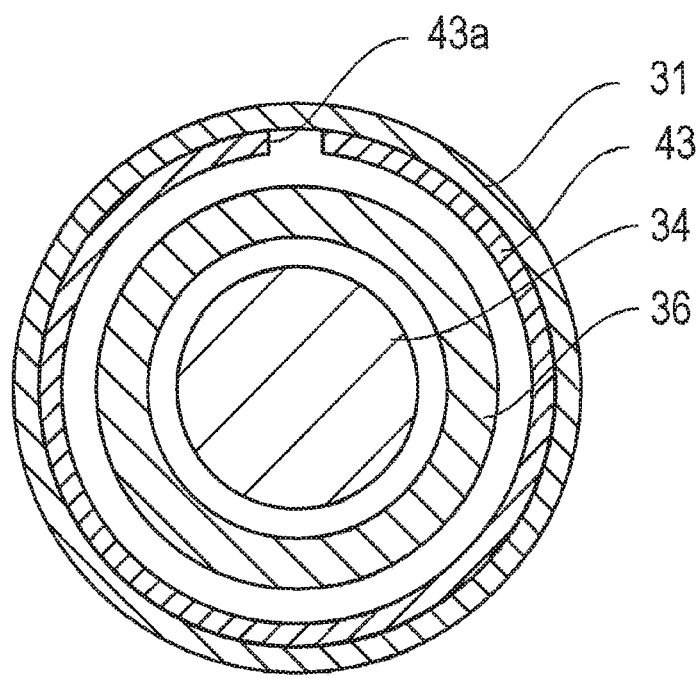
FIG. 4 is a cross-sectional view of an A-A line portion illustrated in FIG. 3.

FIG. 3 is a partial cross-sectional view illustrating a configuration of a main part of an exemplary driving section of the opening/closing body opening and closing apparatus of the present embodiment. FIG. 4 is a cross-sectional view taken along A-A line illustrated in FIG. 3.

Driving section 30 includes main-body cylinder portion 31, sliding cylinder portion 32, motor 33, spindle 34, spindle nut 35, and energizing member 36 and/or the like in this embodiment. In driving section 30, main-body cylinder portion 31, motor 33, spindle 34, and energizing member 36 and/or the like correspond to the driving main-body portion, and sliding cylinder portion 32 and spindle nut 35 correspond to the forward-backward moving section.

Main-body cylinder portion 31 is rotatably fixed to opening member 10 at one end of main-body cylinder portion 31 and is opened at the other end thereof. Motor 33 is disposed inside of main-body cylinder portion 31 on a side of the one end portion of main-body cylinder portion 31, and sliding cylinder portion 32 is disposed inside of main-body cylinder portion 31 on a side of the other one end portion of main-body cylinder portion 31 so as to be slidingly movable in a longitudinal direction.

Note that, fixing end portion 39 which covers the opening on a side of one end of main-body cylinder portion 31 is provided on the side of the one end thereof. Fixing end portion 39 includes a ball socket section. By connecting a ball of attachment member 12 to be fixed to opening member 10 to the ball socket section, main-body cylinder portion 31 is connected rotatably to opening member 10.

Motor 33 is driven to move the forward-backward moving section in the longitudinal direction to extend and contract driving section 30 with respect to the driving main-body section. Motor 33 is an electric motor and is a DC motor or an AC motor. In a case where opening/closing body opening and closing apparatus 1 is applied to an automobile, a DC motor is preferably adopted because a DC power supply of the automobile is available. Note that, motor 33 is connected to opening/closing control section 80 via motor connectors 70A and 70B (see FIG. 5) and rotational driving of rotation of both forward rotation and reverse rotation is controlled by opening/closing control section 80.

Base-end portion 34a of spindle 34 which extends in the longitudinal direction and is disposed inside of sliding cylinder portion 32 is connected to motor 33.

Spindle 34 is disposed coaxially with a rotation shaft of motor 33 and coupled to the rotation shaft of motor 33 by base-end portion 34a. Spindle 34 is disposed rotatably about the shaft via a bearing at main-body cylinder portion 31 on a side of base-end portion 34a.

Male-screw portion 341 is formed on an outer periphery of spindle 34 and screwed into spindle nut 35.

Spindle nut 35 is driven by rotation of spindle 34 and moves on spindle 34 in a rotational axis direction of spindle 34.

More specifically, in spindle nut 35 having a cylindrical body, female-screw portion 35a is provided on an inner periphery on a side of the base end. Female-screw portion 35 is configured to be screwed with male-screw portion 341 on the outer periphery of spindle 34.

A leading-end portion of spindle 34 is disposed within spindle nut 35, and bearing 41 is attached to the leading-end portion of spindle 34. The leading-end portion of spindle 34 is longitudinally movable via bearing 41 within spindle nut 35.

The other end portion of spindle nut 35 is fixed to slide end portion 40 via lid portion 37 together with the other end portion of sliding cylinder portion 32.

Energizing member 36 energizes slide end portion 40 in a direction away from fixing end portion 39 and generates a force in a direction in which driving section 30 extends, such that the force acts against the own weight of opening/closing body 20 which is supported by driving section 30.

When an operation to open opening/closing body 20 is performed by driving section 30, i.e., when sliding cylinder portion 32 is moved in an extension direction, the load of opening/closing body 20, which is applied due to the own weight of opening/closing body 20 when motor 33 rotates spindle nut 35, can be reduced.

Energizing member 36 herein is a coil spring and is disposed on an inner side of sliding cylinder portion 32 and around spindle nut 35. Energizing member 36 is interposed between coil base 38 and slide end portion 40.

Although coil base 38 is fixed within main-body cylinder portion 31 by the energizing force of energizing member 36, coil base 38 may be fixed by an adhesive, welding, and/or the like.

Sliding cylinder portion 32 is configured to protrude from the other end portion of main-body cylinder portion 31 and to extend or contract as an entirety of driving section 30 by longitudinal sliding movement of sliding cylinder portion 32.

Sliding cylinder portion 32 has protruding portion 32a on an outer periphery of sliding cylinder portion 32.

Guide cylinder portion 43 is disposed between sliding cylinder portion 32 and main-body cylinder portion 31 surrounding sliding cylinder portion 32.

Guide cylinder portion 43 is disposed inside of main-body cylinder portion 31, and the rotation of a direction about the shaft is regulated by coil base 38, and guide cylinder portion 43 has guide portion 43a having a groove shape which extends longitudinally. In guide portion 43a, protruding portion 32a of sliding cylinder portion 32 is disposed. Although sliding cylinder portion 32 is longitudinally movable, the rotation of sliding cylinder portion 32 in a circumferential direction is regulated.

When motor 33 is driven in driving section 30 configured in the manner described above, spindle 34 rotates. Therefore, spindle nut 35 regulated to be movable only longitudinally via sliding cylinder portion 32 moves longitudinally by the rotation of spindle 34. The forward-backward moving section moves with this movement of spindle nut 35, and thus slide end portion 40 moves. Since opening/closing body 20 is connected to slide end portion 40, opening/closing body 20 itself moves in the opening direction or closing direction and can be positioned in a fully closed position and a fully opened position. Moreover, opening/closing body 20 has a structure which moves opening/closing body 20 by screwing spindle 34 into spindle nut 35 and with which opening/closing body 20 is always energized in the opening direction by energizing member 36. Thus, even when opening/closing body 20 is in the fully opened position or in a halfway position of movement, opening/closing body 20 does not move in the closing direction without an external factor.

Moreover, when power is turned off, motor 33 is in a free mode. In this mode, manual movement via opening/closing body 20 which is supported by driving section 30 is possible. That is, when an attempt to move sliding cylinder portion 32 longitudinally via opening/closing body 20 is made by applying a load to opening/closing body 20, spindle nut 35 screwed into spindle 34 follows the movement and extends and contracts longitudinally in the free mode, and thus, opening/closing body 20 can move in the opening direction or the closing direction.

[Control System]

Figure 5:
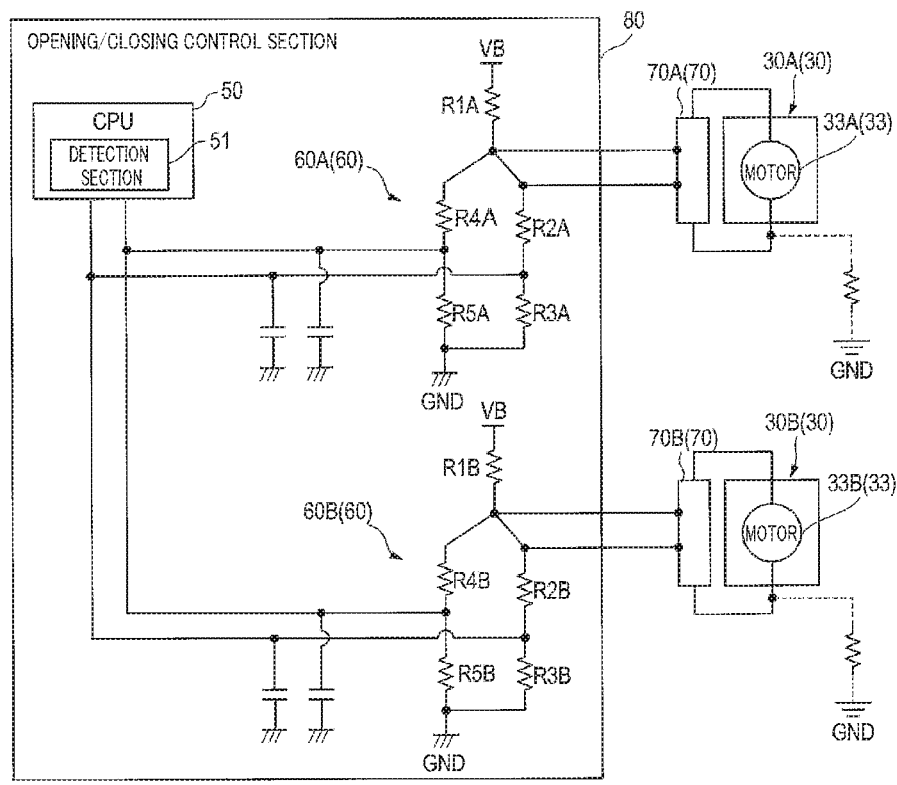
FIG. 5 is a diagram illustrating a control system of the opening/closing body opening and closing apparatus.

FIG. 5 is a diagram illustrating a control system of the opening/closing body opening and closing apparatus described above. Note that, for the sake of convenience, when a specific component is mentioned in association with driving section 30A, the reference sign "A" is given to the reference numeral of the specific component, and when a specific component is mentioned in association with driving section 30B, the reference sign "B" is given to the reference numeral of the specific component.

[Opening/Closing Control Section and Detection Section]

Opening/closing control section 80 of opening/closing body opening and closing apparatus 1 controls a plurality of driving sections 30. Opening/closing control section 80 includes central processing unit (CPU) 50, and voltage detection circuit sections 60A and 60B connected between CPU 50 and driving sections 30A and 30B, respectively. Opening/closing control section 80 is composed of, for example, an electronic control unit (ECU) which controls each part of a vehicle, and controls and monitors each part of opening/closing body opening and closing apparatus 1. Opening/closing control section 80, for example, monitors the driving states of driving sections 30A and 30B by detecting voltage signals respectively in motors 33A and 33B of driving sections 30A and 30B via voltage detection circuit section 60A including resistors R1A to R5A and voltage detection circuit section 60B including resistors R1B to R5B.

CPU 50 reads a program from a read only memory (ROM) (not illustrated) in accordance with processing content and loads the read program onto a random access memory (RAM) and performs various controls in cooperation with the loaded program. In the present embodiment, CPU 50 has a function to perform various determination processes to be described later, in addition to a function as detection section 51. Detection section 51 detects an operation of driving section 30.

The operation of driving section 30 herein may be a signal indicating the operation of driving section 30, itself, and/or may be a signal equivalent to the operation of driving section 30. The operation of driving section 30 is detected based on the driving state of driving section 30. Detection section 51 detects the operation of the driving section based on the driving speed of driving section 30, for example.

Note that, detection of the operation of driving section 30 may be performed using any configuration or principle, and may be performed by monitoring a supply voltage or current to motor 33 or a voltage or current of an electromotive force of motor 33, or the rotation state of motor 33 may be magnetically detected, for example, using a Hall element. In the latter case, for example, magnets are disposed in a circumferential direction at different intervals in a disk provided to the rotation shaft of motor 33, and a Hall element is disposed in a position facing the magnets. By the Hall element, the magnets which move in association with rotation of the rotation shaft of motor 33 are caught by a pulse, and the driving speed of the driving section is computed from the caught pulse. Moreover, a configuration which detects an operation of driving section 30, using a camera and/or the like as detection section 51 may be employed. Moreover, the number of detection sections 51 is not particularly limited. It is possible to detect the operation states of driving sections, using a single detection section, and transmit driving information on the respective driving sections, and it is also possible to detect the operation states of driving sections by driving sections respectively corresponding to the driving sections.

In the present embodiment, detection section 51 detects the driving state of driving section 30 by measuring, using a voltmeter embedded in CPU 50, the supply voltage to motor 33 of driving section 30 and/or the voltage of the electromotive force of motor 33.

Opening/closing control section 80 determines individually whether or not driving sections 30A and 30B are in an abnormal state, based on the driving states of driving sections 30, which have been detected by detection section 51.

The term "abnormal state" of driving section 30 refers to a state in which the moving speed of opening/closing body 20 in the closing direction is faster than a predetermined speed and a part of opening/closing body opening and closing apparatus 1 breaks down or is damaged, or a state in which driving section 30 has come off from the opening member and thus, there is a possibility that opening/closing body 20 rapidly falls off. The predetermined speed herein is a target speed which is previously set for opening/closing body 20, and for example, can be a speed that allows for avoiding by an avoiding action, pinching or collision by the opening/closing body, which is caused by movement of the opening/closing body during an opening or closing operation of opening/closing body 20. Moreover, the state of opening/closing body 20 may be determined accordingly by defining the case where the moving speed of an opening/closing body is faster than a predetermined speed as a state where the speed has not reached yet a speed in an unsafe state of the opening/closing body, but a speed difference compared with a normal state is acknowledged.

Opening/closing control section 80 monitors each of driving sections 30A and 30B during movement of opening/closing body 20 or during stopping of opening/closing body 20 in an open state, and when each of driving sections 30A and 30B is determined to be independently abnormal ("being independently abnormal" means that the driving section is independently in an abnormal state), opening/closing control section 80 performs a regulation control (in other words, braking control) which regulates movement of opening/closing body 20 in the closing direction, for driving section 30 which is independently abnormal (hereinafter, for the sake of convenience, an assumption is made that driving section 30A is independently abnormal). The regulation control will be described later. Regarding driving sections 30A and 30B, when any of the driving sections 30A and 30B is determined to be independently abnormal, the regulation control is performed on the driving section which has been determined to be independently abnormal.

Note that, the term "independently abnormal" means that any of driving sections 30, e.g., driving section 30A is in an abnormal state regardless of whether or not another driving section, which is driving section 30B, is in an abnormal state. Thus, it is not limited that only driving section 30A is in an abnormal state. Finding out whether or not a specific driving section is in an abnormal state regardless of another driving section can be achieved by individually monitoring the operations of the respective driving sections. Note that, the abnormal state can be defined as a state where opening/closing body 20 can be found as being in a state different from an ordinary operation at a specific time point of an opening and closing operation, and thus, it is not needed that the abnormal state is not necessarily an unsafe state.

Whether or not each driving section 30 is independently abnormal is determined based on a driving speed of each driving section 30, and an independent abnormality determination value. The independent abnormality determination value is a predetermined value, and when a driving speed of any of driving sections 30 is equal to or greater than the predetermined value, this driving section 30 is independently abnormal, and when the driving speed of any of driving sections 30 is less than the predetermined value, this driving section 30 is not independently abnormal. The independent abnormality determination value can be a value of a speed allowed for the predetermined speed, in consideration of detection accuracy of detecting section 51, for example, and may be both an upper limit and a lower limit or may be any of the upper and lower limits. Note that, for the independent abnormality determination value can be a value of a case where a speed difference which suspicious of abnormality in a driving environment of an opening/closing body occurs, and it is not necessary that this speed difference is an unsafe speed difference with respect to the target speed of the opening/closing body.

Moreover, the term "driving speed" used herein refers to a driving speed as an entirety of a driving section, and for the driving sections mentioned above, the driving speed can be a moving speed for one end side and the other end side to come close to each other or to be separated from each other. As to the voltage to be detected by detection section 51, the voltage can be computed as a numeric value obtainable by computing a voltage integration value per unit time, then computing the number of revolutions of motor per time unit based on this voltage integration value, and then converting this value. Note that, although the driving speed is computed using a voltage integration value in this example, the computation method is not limited to this. In addition, the independent abnormality determination value is not needed to be a driving speed itself, and may be another parameter having a value corresponding to the driving speed. In this case, the driving speed may be set as a value converted into the parameter and then compared with the independent abnormality determination value. When driving section 30 is determined to be independently in an abnormal state, the regulation control which regulates movement of the opening/closing body in the closing direction is performed as an independent abnormality. This regulation control is to ensure safety for the opening and closing operation of the opening/closing body by performing the regulation control immediately without performing another control in an abnormal state, and is individually performed for each one of driving sections 30.

After an independent abnormality determination is performed for each of a plurality of driving sections 30 and regulation control is performed for at least one of the plurality of driving sections 30, opening/closing control section 80 compares the driving state of the driving section 30A which is independently abnormal and on which the regulation control has been performed, and the driving state of driving section 30B which is another driving section. In comparison of the driving states of driving sections 30A and 30B, for example, the driving speed of driving section 30A which is independently abnormal is compared with the driving speed of driving section 30B which is another driving section. Note that, it is also possible to compare another parameter having a value corresponding to the driving speed, instead of comparing the driving speed itself.

In comparison of the driving states of driving sections 30A and 30B in opening/closing control section 80, a determination is made based on a difference computed by comparing the driving speed of driving section 30A which is independently abnormal, and the driving speed of driving section 30B which is another driving section, and on a relative abnormality determination value. The relative abnormality determination value is a predetermined value, and when the difference between the driving speeds is equal to or greater than the predetermined value, driving section 30A which is independently abnormal and driving section 30B which is another driving section are relatively abnormal, and when the difference between the driving speeds is less than the predetermined value, driving section 30A which is independently abnormal and driving section 30B which is another driving section are relatively normal. The relative abnormality determination value can be, for example, set to a value within a range in which moving speeds of the plurality of driving sections are allowed, in consideration of a driving speed error due to resistance of a conductive wire and/or detection accuracy of detecting section 51, and may be both an upper limit and a lower limit, or may be any one of the upper and lower limits.

When driving sections 30A and 30B are determined to be relatively normal, opening/closing control section 80 releases the regulation control on driving section 30A as opening/closing body 20 is in a normal state. Meanwhile, when driving sections 30A and 30B are determined to be relatively abnormal, opening/closing control section 80 continues the regulation control on driving section 30A as opening/closing body 20 is in an abnormal state.

The regulation control on driving section 30 by opening/closing control section 80 regulates movement of opening/closing body 20 in the closing direction by performing regulation control on driving section 30 in a state where the driving of driving section 30 has been determined to be independently abnormal. The regulation for movement of driving section 30 can be performed by, for example, connecting motor 33 of driving section 30 to a short circuit or applying a reverse voltage and/or a reverse current of a pulse waveform to motor 33, for example. This short circuit may be provided as a bridge circuit which can be short-circuited by performing a switch operation of an FET equivalent to resistors 4R of voltage detection circuit sections 60A and 60B, in addition to voltage detection circuit sections 60A and 60B included in opening/closing control section 80, for example. When motor 33A is regulated, the movement of opening/closing body 20 in the closing direction is regulated via driving section 30A, and when motor 33B is regulated, the movement of opening/closing body 20 in the closing direction is regulated via driving section 30B. That is, as the regulation to be performed on driving sections, the regulation may be braking or movement to an opposite direction, but braking is preferable in consideration of a load on the motor.

Note that, the regulation of movement of driving section 30 is not limited to regulation by an electric operation of a motor and may be a method in which movement of driving section 30 is regulated by keeping sliding cylinder portion 32, spindle 34, and/or the like by a frictional force.

The abnormal state associated with opening and closing movement in opening/closing body opening and closing apparatus 1 is expected to be a case where opening/closing body 20 has moved in the closing direction during an opening/closing operation performed by driving section 30, and/or a case where opening/closing body 20 has moved in the closing direction during a period in which opening/closing body 20 stops in an open state.

In one of the cases, when each of driving sections 30A and 30B is independently abnormal, the regulation control is performed on each of driving sections 30 which are independently abnormal. Then, the driving state of the driving section 30 on which the regulation control has been performed and the driving state of another driving section 30 are compared with each other, and when these driving sections 30 are determined to be relatively normal, the regulation control on driving section 30 on which the regulation control has been performed is released as opening/closing body 20 is in a normal state. Moreover, when these driving sections 30 are determined to be relatively abnormal, the regulation control on driving section 30 on which the regulation control has been performed is continued as opening/closing body 20 is in an abnormal state. Even when any of driving sections 30 is independently abnormal, as long as driving sections 30 are relatively normal, the opening/closing body can be determined to be in a state different from an unsafe state in which the moving speed of opening/closing body 20 is further accelerated, because the movement of opening/closing body 20 is in a state of being supported by each driving section 30.

[Regulation of Operation of Opening/Closing Body 20 in Opening/Closing Body Opening and Closing Apparatus]

Figure 6:
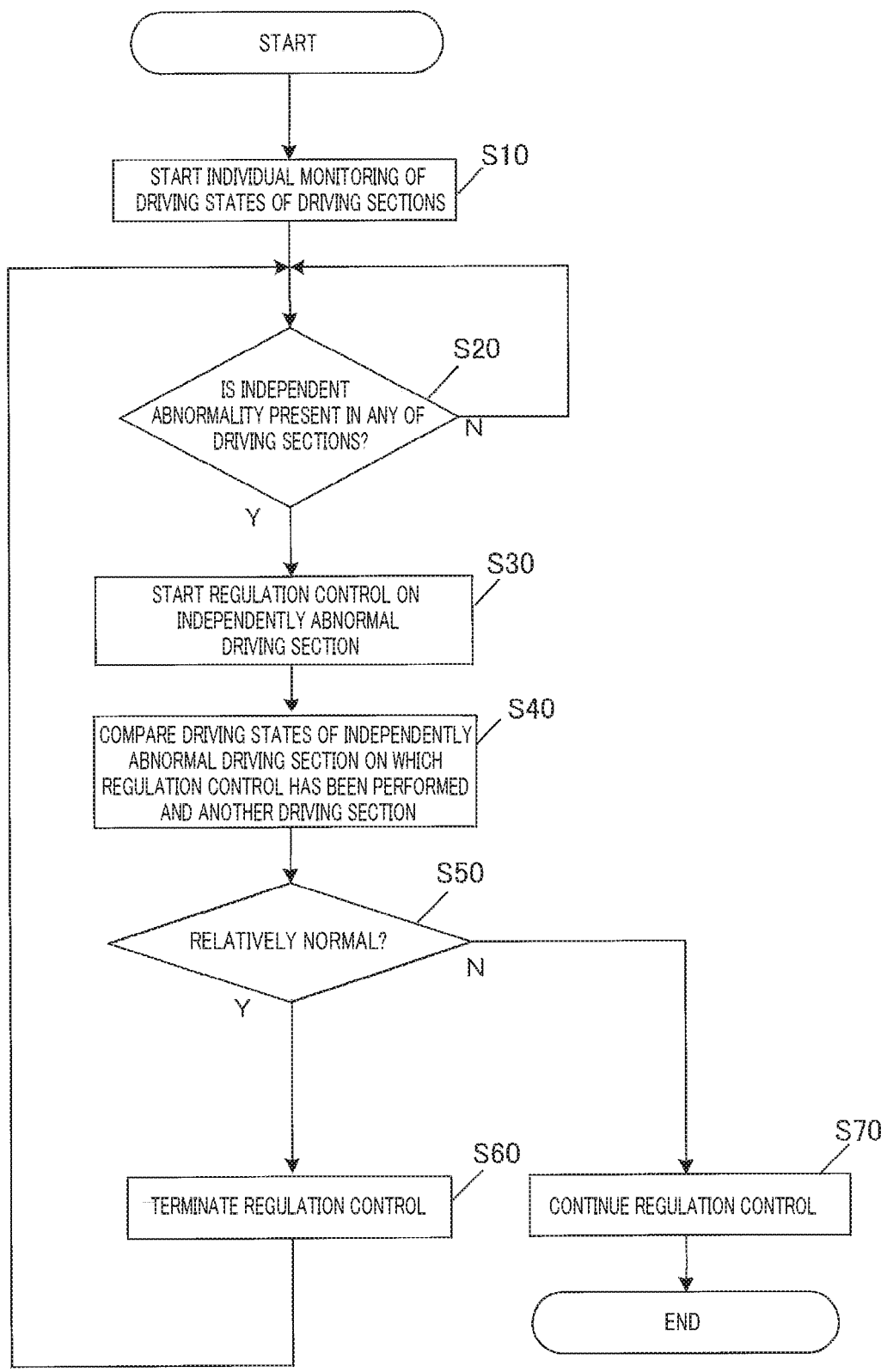
FIG. 6 is a flowchart for describing an operation of the opening/closing body opening and closing apparatus.

FIG. 6 is a flowchart for describing an operation of the opening/closing body opening and closing apparatus.

In opening/closing body opening and closing apparatus 1, opening/closing control section 80 starts individual monitoring of the driving states of a plurality of driving sections via detection section 51 of CPU 50 in step S10, first. This monitoring may be performed at least during movement of opening/closing body 20 by driving sections 30A and 30B or during a period in which opening/closing body 20 stops in an open state. Opening/closing control section 80 monitors the individual driving states of driving sections 30A and 30B by, for example, individually monitoring voltages of supply power to driving sections 30A and 30B.

In step S20, opening/closing control section 80 determines whether or not there is an independent abnormality in any of driving sections 30 under monitoring by opening/closing control section 80 and repeats this processing until an independently abnormal driving section is present. When an independently abnormal driving section is present, the processing moves to step S30. A determination of an independent abnormality in opening/closing control section 80 is made by assuming, for example, in a case where the rotation speed computed based on a supply voltage to motor 33 or a voltage of an electromotive force of motor 33 is higher than a predetermined threshold, to be an operation in which opening/closing body 20 is moving at a speed faster than an expected speed.

In step S30, opening/closing control section 80 starts regulation control for a driving section which has been determined to be an independently abnormal driving section by opening/closing control section 80. This stops movement of opening/closing body 20 in the closing direction.

In step S40, opening/closing control section 80 compares the driving state of the driving section on which the regulation control has been performed and the driving state of another driving section. In step S50, opening/closing control section 80 determines whether or not a difference (e.g., driving speed difference) between the driving state of the independently abnormal driving section on which the regulation control has been performed and the driving state of another other driving section is relatively normal. When this difference is normal, the driving state of the driving section on which the regulation control has been performed is determined to be normal, and the processing moves to step S60 and the regulation control is released. After the regulation control is released, the processing returns to step S20 and repeats the processing.

When the difference is not normal, the processing moves to step S70, and the regulation control is continued. That is, opening/closing body opening and closing apparatus 1 continues the regulation control which has been already started for the independently abnormal driving section, and the processing is ended. Note that, when the regulation control is continued, an alarm output and/or a warning display may be provided.

[Effects]

As described above, in the present embodiment, a plurality of driving sections 30 for opening and closing opening/closing body 20 are individually monitored, and when there is an operation determined to be independently abnormal in each of driving sections 30 among the plurality of driving sections 30, regulation control, i.e., a control to regulate movement of opening/closing body 20 in the closing direction, is immediately performed for driving section 30 which has been determined to be independently abnormal.

Thus, in a case where an abnormal state of opening/closing body 20 in which movement of opening/closing body 2 in the opening direction cannot be performed or the open state of opening/closing body 20 cannot be maintained occurs due to a breakdown of any of driving sections 30, the regulation control for the driving section which is independently in an abnormal state is started without waiting for a determination of whether or not opening/closing body 20 is actually in an abnormal state. Thus, safety can be secured at an early stage. In addition, in a case where it is found out that opening/closing body 20 is not actually in an abnormal state, the regulation control may be promptly released as mentioned above.

Figure 7:
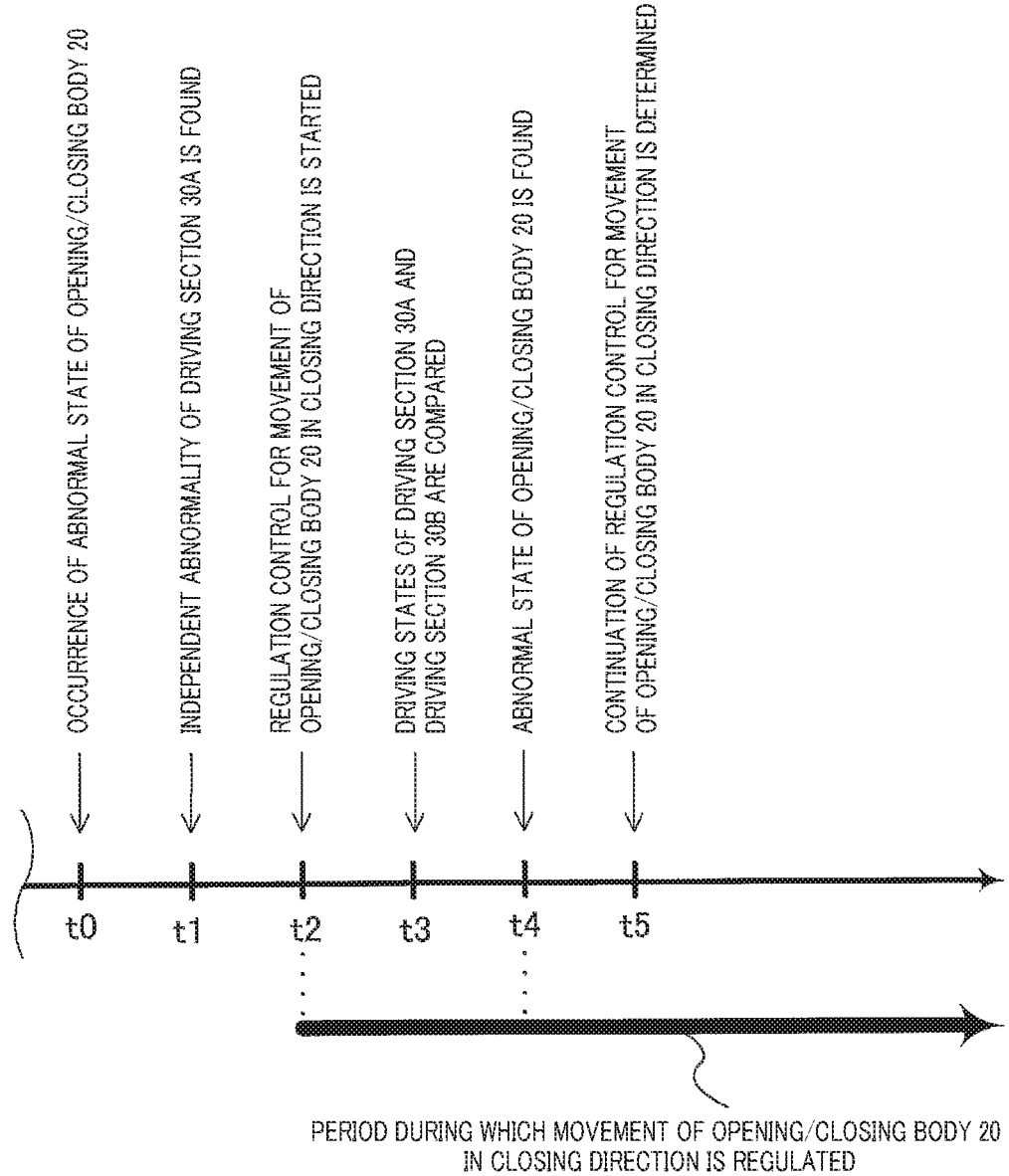
FIG. 7 is a diagram provided for describing a time context of each event in a situation where an abnormality occurs in the opening/closing body.

A description of a time context of each event in an abnormality occurrence situation of opening/closing body 20 will be given herein with reference to FIG. 7. When an abnormal state of opening/closing body 20 occurs (timing t0) in opening/closing body opening and closing apparatus 1, by individual monitoring of a plurality of driving sections by opening/closing control section 80, an independent abnormality of driving section 30A is found (timing t1), for example. Then, immediately, opening/closing control section 80 starts performing the regulation control for driving section 30A (timing t2), and thus, movement of opening/closing body 20 in the closing direction is regulated. Then, the driving state of driving section 30A is compared with the driving state of another driving section which is driving section 30B in opening/closing control section 80 (timing t3). The fact that an abnormality occurs in opening/closing body 20 is found by the comparison result (timing t4). In response to the fact that an abnormal state of opening/closing body 20 has been found, continuation of the regulation of movement of opening/closing body 20 in the closing direction is settled in opening/closing control section 80 (timing t5), and the regulation control which has already been started is continued without any change. That is, when opening/closing body 20 is actually in an abnormal state, the regulation for movement of opening/closing body 20 in the closing direction is started from the time point (timing t2) at which an independent abnormality of the driving section is found, before it is actually found that opening/closing body 20 is in an abnormal state at timing t4. Thus, movement of opening/closing body 20 can be safely and surely regulated before a rapid falling off and/or the like of opening/closing body 20 occurs.

The embodiment disclosed this time is only exemplary in every aspect and should be considered nonrestrictive. The scope of the present invention is indicated not by the description above but by claims, and it is intended that every change within meaning or range equivalent to the claims is included.

The embodiment of the present invention has been described thus far. Note that, the above description is only illustration of a preferred embodiment of the present invention, and the scope of the present invention is not limited to this. That is, the descriptions of the configuration of the above-mentioned apparatus and the shape of each portion are only exemplary, and it is obvious that for various changes and additions to these examples are possible within the scope of the present invention.

INDUSTRIAL APPLICABILITY

The opening/closing body opening and closing apparatus according to the present invention brings about an effect of preventing a rapid falling off of an opening/closing body, with a simple structure, and is useful as an apparatus applied to a rear part of a vehicle body provided with a tailgate in an automobile.

REFERENCE SIGNS LIST

1 Opening/closing body opening and closing apparatus
10 Opening member
11 Opening
12 Attachment member
20 Opening/closing body
30, 30A, and 30B Driving section
31 Main-body cylinder portion
32 Sliding cylinder portion
32*a* Protruding portion
33, 33A, and 33B Motor
34 Spindle
34*a* Base-end portion 35 Spindle nut
35a Female-screw portion
36 Energizing member
38 Coil base
39 Fixing end portion
40 Slide end portion
41 Bearing
43 Guide tubular portion
43a Guide portion
50 CPU
51 Detection section
60, 60A, and 60B voltage detection circuit section
70, 70A, and 70B Motor connector
80 Opening/closing control section
341 Male-screw portion

The invention claimed is:

1. An apparatus to open and close an opening/closing body, the apparatus comprising:
   an opening member including an opening;
   the opening/closing body which sets the opening to an open state or a closed state, wherein a mass of the opening/closing body acts in a closing direction;
   two drivers which move the opening/closing body in an opening direction and the closing direction;
   a processor which controls the drivers; and
   a detection circuit which detects an operation of the drivers,
   wherein the processor monitors driving states of the drivers by a signal from the detection circuit,
   the processor determines one of the drivers to be independently abnormal, when a driving speed of the one of the drivers is equal to or greater than an independent abnormality determination value,
   when the one of the drivers is determined to be independently abnormal during movement of the opening/closing body by the drivers, the processor performs a regulation control on the one of the drivers which is independently abnormal, the regulation control regulating movement of the opening/closing body in the closing direction,
   the processor compares the driving speed of the one of the drivers on which the regulation control has been performed and a driving speed of the other one of the drivers, and when a difference between the compared driving speeds is less than a relative abnormality determination value, the processor determines that the one of the drivers which is independently abnormal and the other one of the drivers are normal, and
   when one of the drivers which is independently abnormal and another one of the drivers are determined to be normal, the processor releases the regulation control on the one of the drivers which is independently abnormal.

2. The apparatus according to claim 1, wherein the processor regulates the movement of the opening/closing body in the closing direction by shorting a circuit of the one of the drivers which is independently abnormal.

* * * * *